US 6,609,426 B1

(12) United States Patent
Altmann et al.

(10) Patent No.: US 6,609,426 B1
(45) Date of Patent: Aug. 26, 2003

(54) PRESSURE SENSOR

(75) Inventors: Markus Altmann, Moos-Bankholzen (DE); Robert Skofljanec, Moos-Bankholzen (DE); Clemens Müller, Radolfzell (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 0 days.

(21) Appl. No.: 09/696,796

(22) Filed: Oct. 25, 2000

(30) Foreign Application Priority Data

Oct. 27, 1999 (DE) .......................... 299 18 915

(51) Int. Cl.[7] ................................ G01L 7/08
(52) U.S. Cl. ................................. 73/715
(58) Field of Search ................ 73/716, 717, 718, 73/720, 723, 724, 727, 756, 715; 200/82, 83, 835; 428/137; 338/100, 136, 42; 600/587; 361/283.1–283.4

(56) References Cited

U.S. PATENT DOCUMENTS

| 3,045,704 A | 7/1962 | Williams |
| 3,386,067 A | 5/1968 | Costanzo |
| 5,045,829 A | 9/1991 | Kuramochi et al. |
| 5,090,246 A | * 2/1992 | Colla et al. ............. 73/718 |
| 5,654,512 A | * 8/1997 | Harnett et al. ........ 73/861.53 |
| 5,665,921 A | * 9/1997 | Gerst et al. ............. 73/715 |
| 6,083,179 A | * 7/2000 | Oredsson ............... 600/587 |

FOREIGN PATENT DOCUMENTS

| CH | 383035 | 12/1964 |
| DE | 2240286 | 3/1974 |
| DE | 2730764 A1 | 1/1979 |
| DE | 4201313 A1 | 7/1993 |
| JP | 57182138 | 11/1982 |

* cited by examiner

Primary Examiner—Hezron Williams
Assistant Examiner—Marissa Ferguson
(74) Attorney, Agent, or Firm—Tarolli, Sundheim, Covell & Tummino L.L.P.

(57) ABSTRACT

A pressure sensor comprises a sensor diaphragm which on one of its surfaces can be acted upon by the fluid pressure to be defected. The sensor diaphragm is rigidly supported at its opposite surface. It is made of an elastomeric material of an electrically non-conducting material wherein fine particles of electrically conducting material are homogenously embedded and distributed in such a density that a compression of the sensor diaphragm caused by the fluid pressure results in a measurable change in its electrical resistivity.

15 Claims, 4 Drawing Sheets

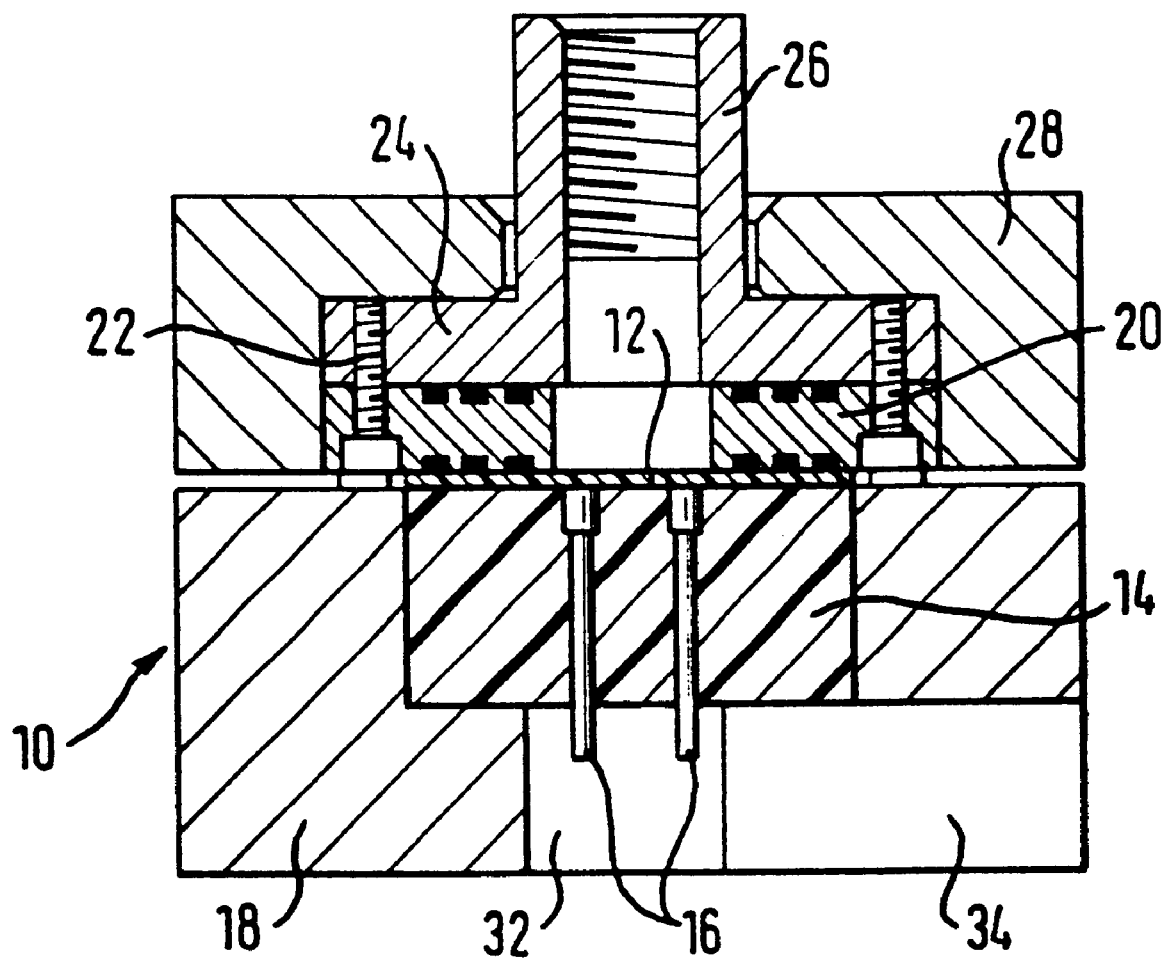

PRESSURE SENSOR

FIELD OF THE INVENTION

The present invention relates to a pressure sensor comprising a sensor diaphragm having a surface adapted to be exposed to a fluid under pressure.

BACKGROUND OF THE INVENTION

Pressure sensors exist in various types depending on their field of application. In automotive engineering applications only rugged types come into consideration which are capable of reliable operation over a broad temperature range for many years, whilst their absolute sensing accuracy is of less importance. The response of most pressure sensors is a function of pressure, i.e. the magnitude being a measure of the sensed pressure. An elastomeric sensor diaphragm exposed to a constant reference pressure on one side and to the fluid pressure to be sensed at the other responds to the difference in pressure by a deflection, the magnitude of which is convertible e.g. by a connected potentiometer into an electrical signal. Limit switches are actuated directly or indirectly by the response of the sensor diaphragm in triggering switching actions as a function of the pressure. In all cases, moving parts are needed which are exposed over lengthy periods to shock, wear and heavy temperature effects, the fluid separation between the two sides of a sensor diaphragm also being problematic under these circumstances.

SUMMARY OF THE INVENTION

The present invention provides a pressure sensor which due to its rugged design, very simple configuration and compact size is particularly suitable for automotive engineering applications in not only producing a pressure-proportional measured variable but also controlling switching actions as a function of pressure.

In accordance with the invention the sensor diaphragm is rigidly supported on its surface opposite the surface exposed to pressure. The sensor diaphragm is made of an elastomeric material in the electrically non-conducting mass of which fine particles of electrically conducting material are embedded so as to be homogenously distributed. A compression of the sensor diaphragm caused by the fluid pressure results in a measurable change in the surface resistance, or resistivity, of the sensor diaphragm because the particles of electrically conducting material are moved closer to each other as a result of which the probability of the neighboring particles coming into contact with each other is increased. Accordingly, the pressure sensor in accordance with the invention requires no moving parts whatsoever, thus eliminating the problems associated with moving parts such as susceptibility to failure, bulkiness, wear, high production costs and leakage problems. The electrical surface resistance of the sensor diaphragm can be determined by contact being made at two measurement points spaced away from each other. Conventional measurement circuits can be used. For generating a pressure-proportional measurement signal a bridge circuit is used to advantage. For controlling a switching action as a function of pressure simple differential amplifier circuits are suitable.

In the preferred embodiment of the invention the sensor diaphragm has two measurement contacts on the side of its rigidly supported surface, the sensor diaphragm as such thus ensuring a perfect separation of fluid.

The configuration of the pressure sensor is based preferably on the simple principle of the sensor diaphragm being clamped by a supporting block between annular components with sealing rings being interposed.

BRIEF DESCRIPTION OF THE DRAWINGS

Further advantages and features of the invention read from the following description of one embodiment of the pressure sensor with reference to the attached drawings in which

FIG. 4 is a section taken along the line IV—IV as shown in FIG. 1;

DESCRIPTION OF THE PREFERRED EMBODIMENTS

Figure 1:
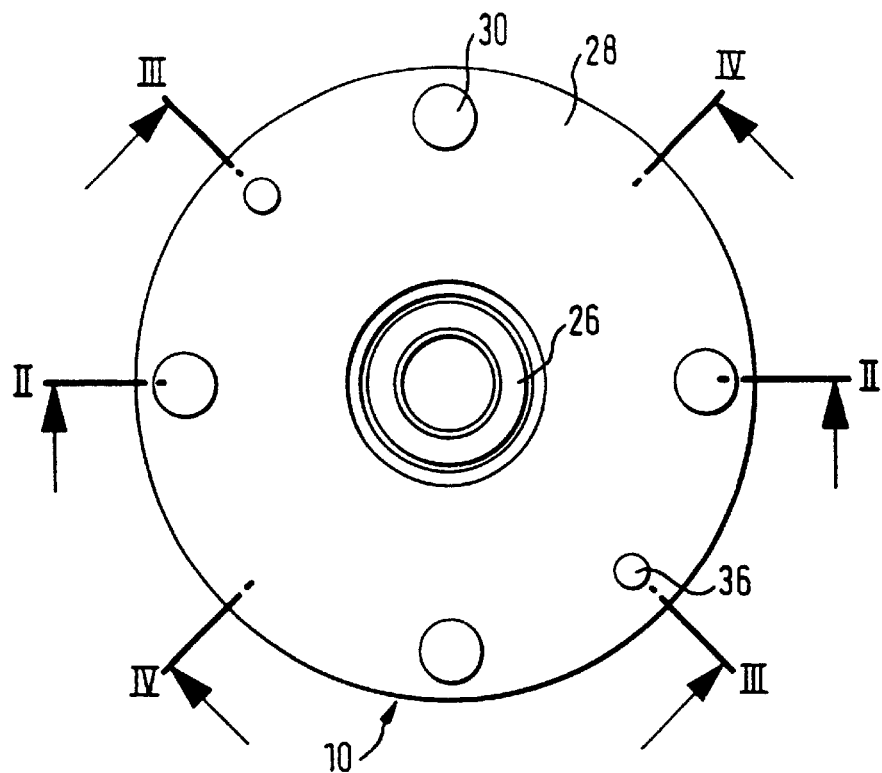
FIG. 1 is a plan view of the pressure sensor on its fluid side.
Figure 2:
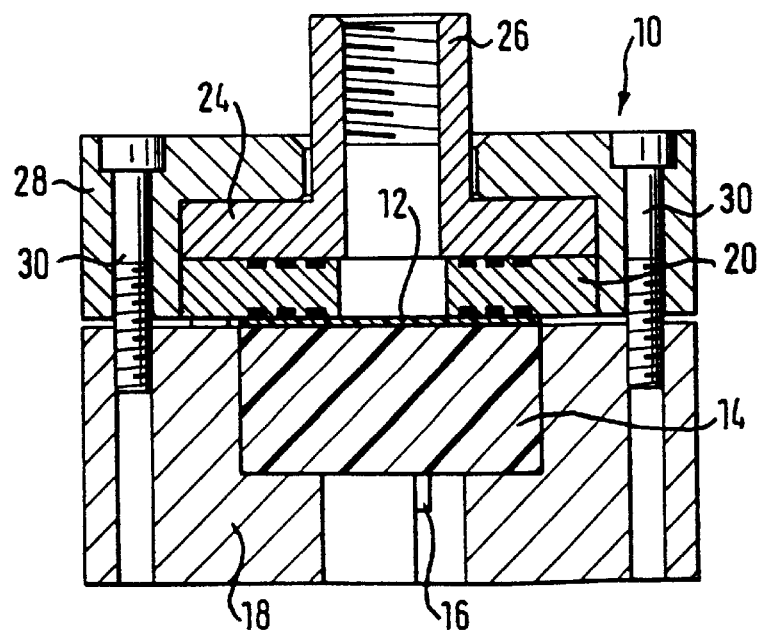
FIG. 2 is a section taken along the line II—II as shown in FIG. 1.
Figure 3:
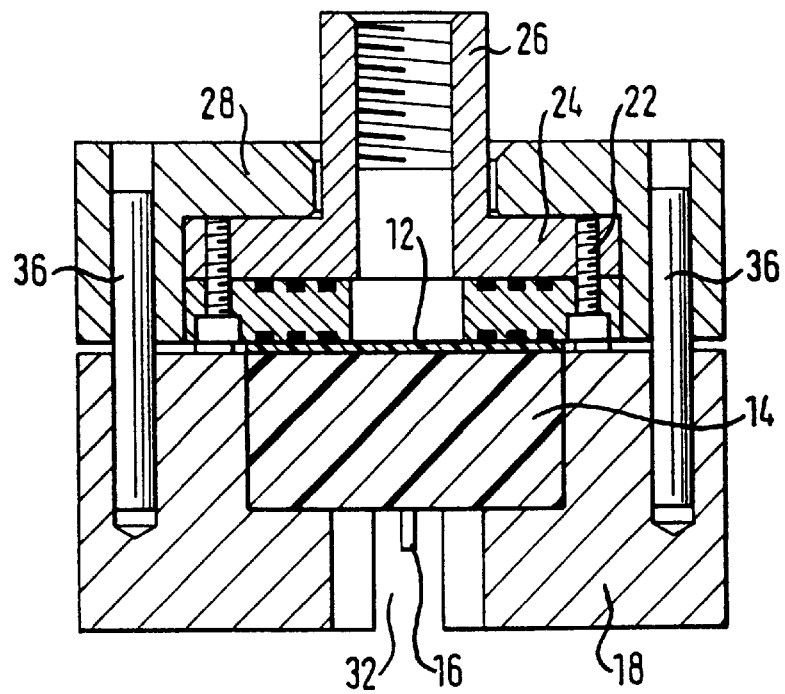
FIG. 3 is a section taken along the line III—III as shown in FIG. 1.
Figure 5:
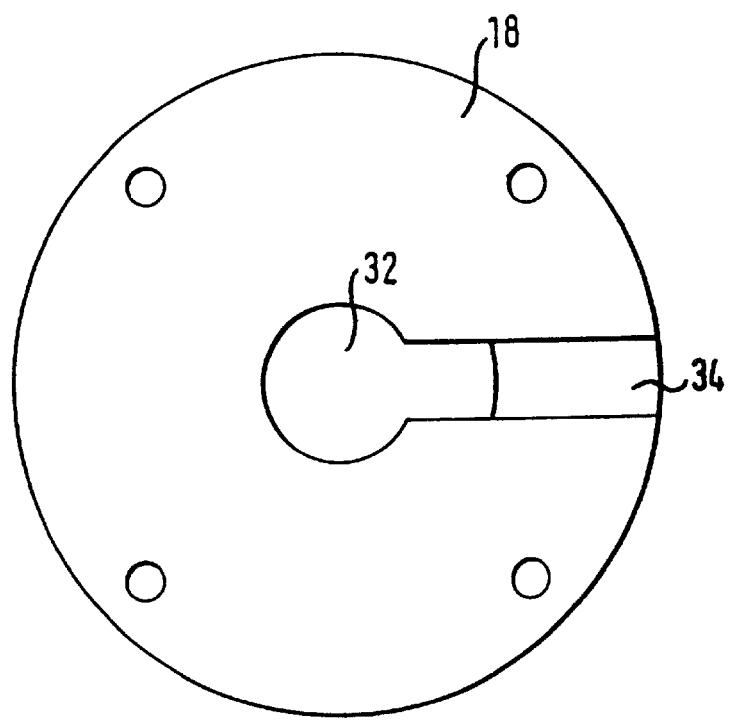
FIG. 5 is a plan view of the pressure sensor on its base body side.

Referring now to FIGS. 1 to 5 there is illustrated a pressure sensor identified in general by the reference numeral 10, comprising as the main functional element a sensor diaphragm 12 made of an electrically insulating elastomer incorporating particles of an electrically conducting material embedded in the elastomer mass. The electrically conducting particles are provided in such a density that they endow the sensor diaphragm with a measurable volume resistance and thus also a surface resistance. This electrical volume resistance or surface resistance is measurably reduced on compression of the diaphragm mass by the conductive particles being bunched together to thus enhance the probability of them coming into contact with each other. A suitable elastomer is silicone rubber, in which electrically conducting particles are embedded homogeneously distributed. The density of the conductive particles may be determined empirically, suitable examples of which are particles of nickel, silver, copper or silver coated particles of copper or glass.

The sensor diaphragm 12 is a flat circular disk resting by one of its two surfaces on a face surface of a cylindrical supporting block 14 by which it is rigidly supported. In the supporting block 14 consisting of an electrically insulating material two contact pins 16 are embedded having widened ends facing the sensor diaphragm and which are in full contact with the sensor diaphragm 12 for the purpose of forming the measuring contacts. The opposite ends of the contact pins 16 protrude from the supporting block and form connecting pins for a connector. The supporting body 14 is snugly accommodated in a cylindrical depression of an annular base body 18.

A compression ring 20 is provided on its two annular surfaces with three concentric grooves for reveiving O-rings and is supported by the surface of the sensor diaphragm 12 facing away from the supporting block 14. By its opposite annular surface the compression ring 20 is clamped against a ring flange 24 at one end of a connecting port 26 by clamping bolts 22. The assembly formed by the compression ring 20 and the ring flange 24 with the connecting port 26 is clasped by a clamping ring 28 which is clamped against the base body 18 by means of clamping bolts 30, as a result of which the compression ring is urged against the surface of the sensor diaphragm 12. This contact pressure is definable by inserting shims between the clamping ring 28 and the base body 18.

Referring now to FIG. 4 there is illustrated how the annular base body 18 forms in its middle a connector depression 32 into which the contact pins 16 protrude, a radial cable conduit 34 adjoining the connector depression 32.

Precise alignment of the assembled components of the pressure sensor is achieved by locating pins 36 inserted in correspondingly aligned holes in the clamping ring 28 and the base body 18, these locating pins also precisely defining the rotary positions of the pressure sensor components relative to each other.

The connecting port 26 surrounds a fluid passage porting into the central opening of the compression ring 20 surrounding the exposed part of the sensor diaphragm surface. This sensor diaphragm surface is acted upon via the connecting port 26, with the fluid pressure to be determined. Separating the media is done by the sensor diaphragm itself in conjunction with the O-rings inserted in the grooves of the compression ring 20.

The contact pins are connected via a connector (not shown) to an electronic circuit which depending on the particular application of the pressure sensor may be configured e.g. as a bridge circuit for generating a pressure-proportional measurement signal or as a differential amplifier for activating switching actions as a function of the pressure. By applying the fluid pressure infed via the connecting port 26 to the exposed surface of the sensor diaphragm 12 the mass of the sensor diaphragm 12 is compressed, as a result of which its electrical volume resistance and thus also its surface resistance available via the contact pins 16 is reduced. For maximizing the measurement signal the ends of the contact pins 16 are arranged in the region of the clamped peripheral rim of the sensor diaphragm 12.

In the embodiment shown the sensor diaphragm 12 is a round flat disk of material. However, it may also be configured as a three-dimensionally shaped body adapted to special applications.

The embodiment as shown in FIGS. 1 to 5 is particularly suitable for testing since using the clamping bolts 30 makes for a releasable assembly.

Figure 6:
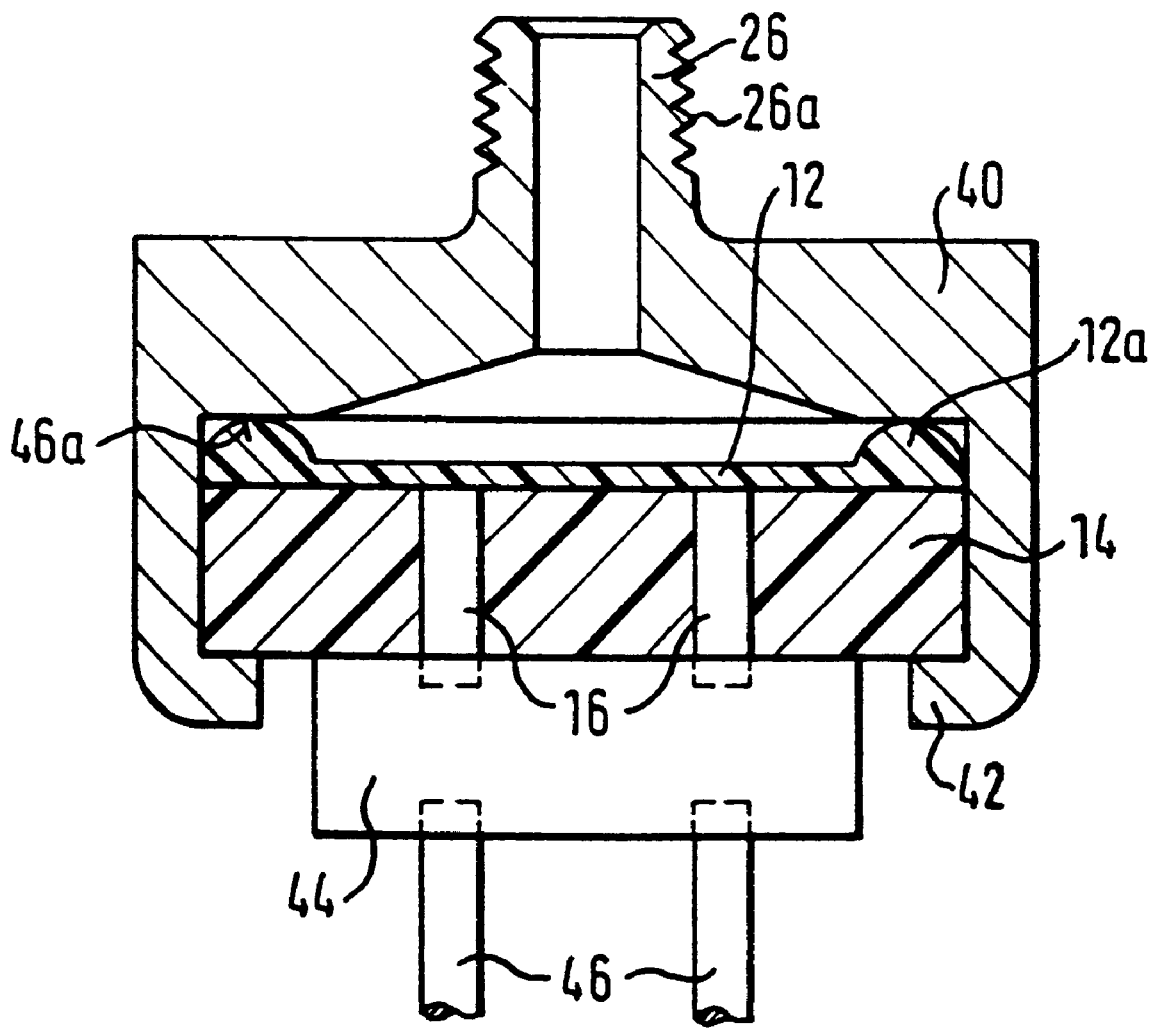
FIG. 6 is a section view of a preferred embodiment of the pressure sensor.

Referring now to FIG. 6 there is illustrated an embodiment suitable for cost-effective series production. In this embodiment the connecting port 26 is provided with a female thread 26a configured integrally with a housing body 40 into which the supporting block 14 is inserted. The supporting block 14 is with the sensor diaphragm 12 mounted thereon is rigidly fixed by a crimped rim 42 of the housing body 40. At its outer circumference the sensor diaphragm 12 comprises a molded ring bead 12a which is urged against an opposite ring surface area 40a in the interior of the housing body 40 to seal off the structure. The contact pins 16 protrude into a electronic module, 44 applied to the supporting block 14 from which contact pins 46 are brought out. The electronic module 44 contains at least the high-impedance components of the measuring circuit with which the changes in resistance of the sensor diaphragm 12 are converted into an electrical signal.

One of the contact pins 16 may be eliminated when the sensor diaphragm 12 is in contact—more particularly by its outer circumference—with a compression ring which may be embedded in the supporting block 14. As an alternative the housing body 40 is made of an electrically conducting material, more particularly metal, and forms in all as well as with the ring surface area 40a a ground contact and simultaneously an eletrical shield.

What is claimed is:

1. A pressure sensor comprising a sensor diaphragm, said sensor diaphragm having a portion with a first surface adapted to be exposed to a fluid under pressure, said portion of said sensor diaphragm having a second surface opposite said first surface and aligned with said first surface, said second surface bearing on a rigid support member which blocks movement of said second surface of said portion of said diaphragm due to the fluid under pressure, at least said portion of said sensor diaphragm being made of an electrically non-conducting elastomeric material wherein fine particles of electrically conducting material are homogeneously embedded and distributed in such a density that a compression of said portion of said sensor diaphragm caused by the fluid under pressure acting on said first surface and said rigid support member blocking movement of said second surface results in a measurable change in electrical resistivity of said portion of said sensor diaphragm, only said second surface of said portion of said sensor diaphragm being electrically contacted by at least a pair of electrical measurement contacts arranged on said second surface of said sensor diaphragm.

2. The pressure sensor as set forth in claim 1, wherein said sensor diaphragm is contacted at at least two measurement locations on said second surface, said measurement locations being spaced away from each other, each measurement location being contacted by an associated measurement contact.

3. The pressure sensor as set forth in claim 2, wherein said sensor diaphragm has an outer rim and is rigidly fixed at said rim.

4. The pressure sensor as set forth in claim 3, wherein one of said measurement contacts is formed by a contact ring in contact with said rim of said sensor diaphragm.

5. The pressure sensor as set forth in claim 1, wherein said measurement contacts are arranged adjoining said second surface of said sensor diaphragm.

6. The pressure sensor as set forth in claim 1, wherein an annular pressure plate is clamped against a peripheral rim of said sensor diaphragm on the side of said first surface.

7. The pressure sensor as set forth in claim 6, wherein at least one ring seal surrounds said first surface of said sensor diaphragm is clamped between said pressure plate and said first surface.

8. The pressure sensor as set forth in claims 7, wherein said ring seal is formed by a ring bead formed at an outer circumference of said sensor diaphragm.

9. The pressure sensor as set forth in claim 6, wherein said annular pressure plate in turn is clamped against an annular connecting flange at one end of a connecting port, at least one seal being interposed between said pressure plate and said connecting flange.

10. The pressure sensor as set forth in claim 6, wherein said annular connecting flange is clasped by a clamping ring, said clamping ring being clamped by clamping bolts against a base body, said base body having a recess accommodating said supporting block.

11. The pressure sensor as set forth in claim 2, wherein said measurement contacts have contact pins embedded in said supporting block.

12. The pressure sensor as set forth in claim 10, wherein said clamping ring is connected to said base body by locating pins inserted in holes aligned with each other.

13. The pressure sensor as set forth in claim 11, wherein said base body is annular and said contact pins protrude from said supporting block at a surface thereof facing away from said sensor diaphragm into a connector opening defined in said base body.

14. The pressure sensor as set forth in claim 18, wherein said sensor diaphragm is in full contact with a supporting block and said supporting block with said sensor diaphragm is clamped between an internal ring surface area and a crimped rim of a housing body.

15. The pressure sensor as set forth in claim 15, wherein said housing body is metallic and said ring surface area forms a contact ring contacting said sensor diaphragm at an outer circumference thereof.

* * * * *

UNITED STATES PATENT AND TRADEMARK OFFICE
CERTIFICATE OF CORRECTION

PATENT NO. : 6,609,426 B1
DATED : August 26, 2003
INVENTOR(S) : Marcus Altmann, Robert Skofljanec and Clemens Muller It is certified that error appears in the above-identified patent and that said Letters Patent is hereby corrected as shown below:

Column 6
Line 3, after "claim" change "15" to -- 14 --.

Signed and Sealed this

Twenty-seventh Day of April, 2004

JON W. DUDAS
*Acting Director of the United States Patent and Trademark Office*